Figure 2:

W. M. PAGE & W. TASSIN.
CLAD METAL AND PROCESS OF PRODUCING THE SAME.
APPLICATION FILED FEB. 8, 1911.

1,125,160.

Patented Jan. 19, 1915.

W. M. PAGE & W. TASSIN.
CLAD METAL AND PROCESS OF PRODUCING THE SAME.
APPLICATION FILED FEB. 8, 1911.

1,125,160.

Patented Jan. 19, 1915.
4 SHEETS—SHEET 3.

UNITED STATES PATENT OFFICE.

WILLIAM MARSHALL PAGE, OF RIDLEY PARK, AND WIRT TASSIN, OF CHESTER, PENNSYLVANIA.

CLAD METAL AND PROCESS OF PRODUCING THE SAME.

1,125,160. Specification of Letters Patent. Patented Jan. 19, 1915.

Original application filed April 28, 1910, Serial No. 558,093. Divided and this application filed February 8, 1911. Serial No. 607,345.

*To all whom it may concern:*

Be it known that we, WILLIAM MARSHALL PAGE and WIRT TASSIN, citizens of the United States, residing at Ridley Park, in the county of Delaware and State of Pennsylvania, and Chester, in the county of Delaware and State of Pennsylvania, respectively, have invented certain new and useful Improvements in Clad Metals and Processes of Producing the Same, of which the following is a specification.

This invention relates to clad metals and processes of producing the same; and it comprises a body of copper clad steel having a core or layer of steel weld united to a body or layer of copper having a high electrical conductivity, a good mechanical strength and a certain peculiar texture evinced on polishing and etching, a section of such copper exhibiting a relatively coarse and flaky or platy macrostructure, free of visible lines of demarcation or cleavage between the component plates or flakes, such plates or flakes under the microscope appearing integrally united and each such plate or flake showing very small isometric crystals regularly arranged and having the same lines of orientation in any one plate though having different lines in adjacent plates or flakes; and it also comprises a method of producing such copper clad steel wherein a body of copper is treated while in a molten state by removing oxygen and oxids by solution therein of a more oxidizable metal, such as iron, and thereafter removing the dissolved oxidizable metal, and is thereafter weld united to a body of steel; all as more fully hereinafter described and as claimed.

For commercial purposes, firmly united bodies of compact copper and steel have long been a desideratum. Galvanic coatings and the like are porous and unsatisfactory, and will not stand working. It is difficult to produce a firm and permanent union, of the nature of a weld union, between copper and steel, they being unlike metals. Such metal has recently been produced (see Patents 853,716 and 893,932), and is now commercially available. The present invention relates to an improvement in the methods of producing such metal and to an improved compound metal. Copper clad steel of the characteristics indicated in Patent 893,932 is useful for very many purposes. The copper coating is impervious and may be worked at the same time with and in the same manner as the steel to be attached. A billet may be coated and then worked down to fine wire, sheets, and the like, without rupture of the union between the metals, and the coating metal is improved in its texture and characteristics by the working down. For all the purposes for which such clad metal is designed, it is desirable that the copper, which is ordinarily an outer coating, should be as impervious and compact as possible. Any porosity leads to lack of strength and to the possibility of air and corrosive fluids reaching the underlying steel and producing corrosion. Much of the copper clad metal is used for electrical purposes, and it is therefore also desirable that the coating shall have as high a conductivity as possible. Ordinary copper is however usually more or less impure, containing oxids and gases, both in a state of solution and in a state of mechanical admixture. The copper is usually not quite homogeneous and is more or less porous. Much of the porosity is removed in the ordinary methods of working down copper clad steel but some is apt to remain.

In the present invention copper is preliminarily treated prior to attaching it to the steel in such manner as to make it wholly homogeneous, of good mechanical strength, impervious and compact, and of high electrical conductivity, rendering it much more suitable as a component of copper clad steel. Copper having the characteristics of the metal of the present invention exhibits a peculiar macrostructure and microstructure, rendering it easily identifiable. For the purpose of this preliminary treatment, the molten copper is first treated by dissolving iron or steel therein. This treatment may be, and advantageously is, a part of the operation of producing copper clad steel. On solution of iron or steel in copper, all the oxygen and oxids are removed. The iron combines with the free oxygen present and also with the oxygen of the oxids present as impurities, forming iron oxids which, relative to the copper, are of light specific gravity and rise readily to the surface of molten copper. The copper thus treated is however not directly suitable for the present purposes. The iron which it contains while giving it greater mechanical strength than that of pure copper, nevertheless runs down its conductivity inordinately. The iron-containing copper, for the present purposes, should therefore next be treated to remove the excess of iron. This may be readily done by covering the surface of the molten ferruginous copper with a layer of floating carbon, such as charcoal, coke breeze, etc., and then impinging or approximating a flame upon the protected surface. Under these conditions the iron in the copper burns out at the expense of the oxygen, carbon monoxid, carbon dioxid, etc., of the flame without an oxidation of the copper ensuing and without reabsorption of oxygen by such copper. With the hot flame gases in contact with the carbon floating on the copper, the copper is practically blanketed by an atmosphere of carbon monoxid and carbon dioxid, both of which, under the circumstances, are oxidants for iron while not oxidizing copper. The copper is now perfectly pure and of a peculiar macrostructure and microstructure, as hereinafter described.

A convenient way of effecting the described operation by a solution of iron and removal of excess, is to use a tilting furnace which may be of the type of that described in Patent 929,701 or in the co-pending application of one of us, Serial No. 516,253. In both types of furnace, a tilting furnace chamber is provided with a relatively deep pocket and with a shallow hearth. By transferring the molten copper to the deep pocket, a bar of steel can be passed beneath the surface. The temperature of the copper may be above the melting point of steel. Iron being lighter than copper, the iron dissolved or melted off the surface of the bar tends to rise through the copper, giving a good and effective contact between the two metals for the present purpose. The bar or body of steel inserted may be that which is subsequently to be coated with copper in producing a clad billet. In this operation it may also be given a film coating of copper or copper iron alloy (Patent 853,716). In this treatment with iron or steel, the metalloids and metals of the steel also have a reducing effect upon the copper. Carbon, silicon, phosphorus, and the like, tend to reduce the oxids and oxygen of the copper in the same manner as iron. Their amount in the steel is usually relatively small but insofar as they are present they have the same reducing function as the iron. They do not, however, remain in solution in the copper to any extent. The molten copper, which now contains iron but is free of other impurities, is next transferred back to the shallow hearth and is covered with floating carbon. A flame is then impinged upon or approximated to the surface of the metal until the iron is removed. The copper is now ready for use for forming the main coating body of a clad billet.

The method of purifying copper described is not claimed *per se* herein, as it forms the subject-matter of co-pending application Serial No. 558,093, filed April 28, 1910, of which the present application is a division.

In the production of clad metals by the present invention, the steel to be coated may be preliminarily sandblasted, or otherwise cleaned, then pickled and cleansed, and then provided with a thin, firmly attached coating of copper or copper iron alloy. The picking is best done with a halogen acid, such as hydrochloric or hydrofluoric acid. On dipping the cleansed billet into a bath of highly heated molten copper, a thin clinging film of copper iron-alloy is formed and the billet may be withdrawn covered with this film. After the cleansing, it is best maintained in a casing filled with an inert gas, such as producer gas or nitrogen, and it is best withdrawn from the filming bath into the same atmosphere to prevent burning off the alloy film. As stated, this filming operation may be the same as the first operation of purifying the copper. Where it is not and where the bath is used for filming a number of billets, it soon becomes largely a molten copper-iron alloy from the solution of iron therein. Such copper iron alloy is, however, as good for filming a billet as pure copper. And as the thickness of this first film should always be relatively small, the presence of iron in it does no great harm, even where the clad metal is used for electrical purposes, and probably does some good because of the mechanical strength of the copper iron alloys.

Copper clad iron for electrical purposes is generally used for overhead conductors where a maximum strength must be combined with a maximum conductivity. For this purpose, the core should be of a good, sound, strong steel and the main body of the coating should be of the special purified copper whose manufacture has just been described, the two being linked together by the film coating just described. This film coating serves as a linking member or a nexus; it is a layer which should be thin, and which is integrally united with the copper on the one side and the steel on the other.

Other ways of making the film coating may be adopted. For example, after sandblasting and pickling, the billet may be treated to produce a surface of pure iron thereon, pure iron uniting more readily with copper than does steel and at lower and more convenient temperatures. The billet may, for example, be oxidized, and afterward reduced, as by producer gas or the like. On oxidation of steel, the carbon burns out and on re-reduction of the oxidized surface pure iron is produced. Another convenient way of operating is to treat the pickled billet with superheated streaming steam to produce a cohering thin coating of magnetic oxid on its surface. On now dipping the treated billet in molten copper, the oxygen of the oxid coating and the carbon of the underlying steel react to form oxids of carbon and pure iron, this pure iron coming both from the layer of oxid and from the underlying steel which has been robbed of its carbon. The pure iron thus produced unites very readily with copper. Similarly, though not so advantageously, a billet covered with mill scale may be used. Rusted oxid coatings are not suitable. Mill scale is also magnetic oxid, but the coating of scale does not cohere to the steel as uniformly and thoroughly as that produced by streaming steam in the way described. Further, there is apt to be adhering sand, silicate, slag, etc., which are difficult to remove in the case of a billet covered with mill scale, and there may also be porosities in the coating. Magnetic oxid on dipping into impure copper has in a measure the same oxygen removing properties as iron, since ferrous oxid, which is a component of magnetic oxid, has the power of reducing oxids of copper. Where the copper is of the character known as "underpoled", that is, contains much dissolved oxygen, the clean steel may be directly dipped in it and the oxygen of the copper and the carbon of the superficial layers of the steel will unite, leaving pure iron to combine with the copper.
In a specific embodiment of the present process, a billet may be sandblasted, pickled, and exposed to superheated streaming steam until the described oxid coating is produced. The oxidized billet may then be dipped into a body of impure copper in the well or pocket of a tilting furnace. By a proper adjustment of time, temperature, and other conditions, the copper will be purified of oxygen and oxids and the billet covered with a clinging film of copper iron alloy. The copper, which may now contain iron in excess, may then be flowed back upon a shallow hearth and purified as described, after which it may be cast into proximity to the filmed billet previously produced to form the main body of the coating of such billet. Or, by regulating conditions, the amount of iron dissolved off the billet in the filming operation may be substantially that which is required to remove the impurities from the copper without giving any substantial excess of dissolved iron, in which case the purified copper may be directly used for the main coating. It is, however, usually more convenient to film a number of billets in a body of copper until the copper is pure, except as regards iron, and then purify the copper for coating purposes, coating the filmed billets as fast as produced from another body of copper which has undergone the purifying operation previously.

In accompanying illustrations are shown more or less diagrammatically certain views of sections of metal, and certain illustrations of apparatus elements useful in the described process. In the showing, the views of the metal are as near a reproduction of the original photomicrographs as the limitations of Patent Office drawings permit.

Figure 1:
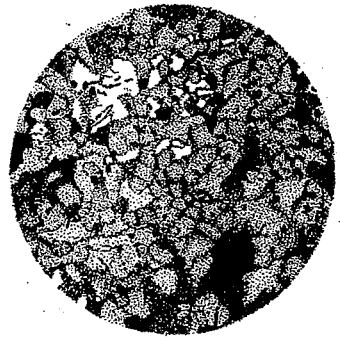
Figure 3:
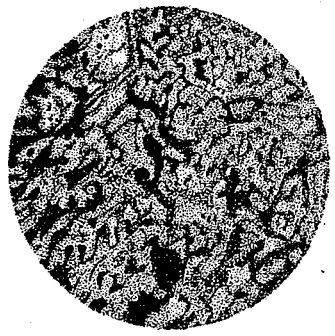
Figure 4:
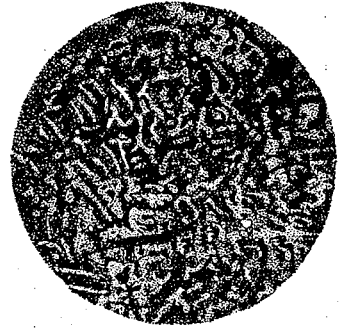
Figure 5:
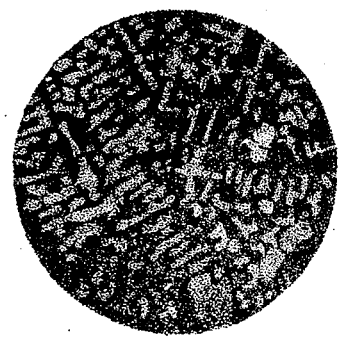
Figure 6:
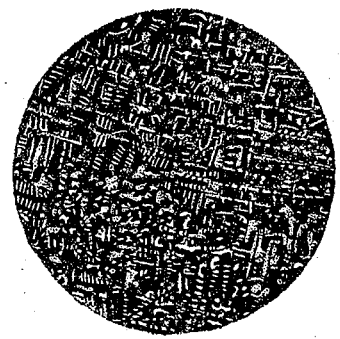
Figure 7:
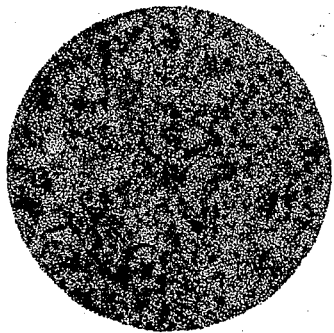
Figure 8:
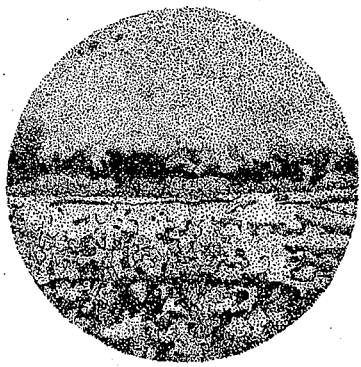
Figure 9:
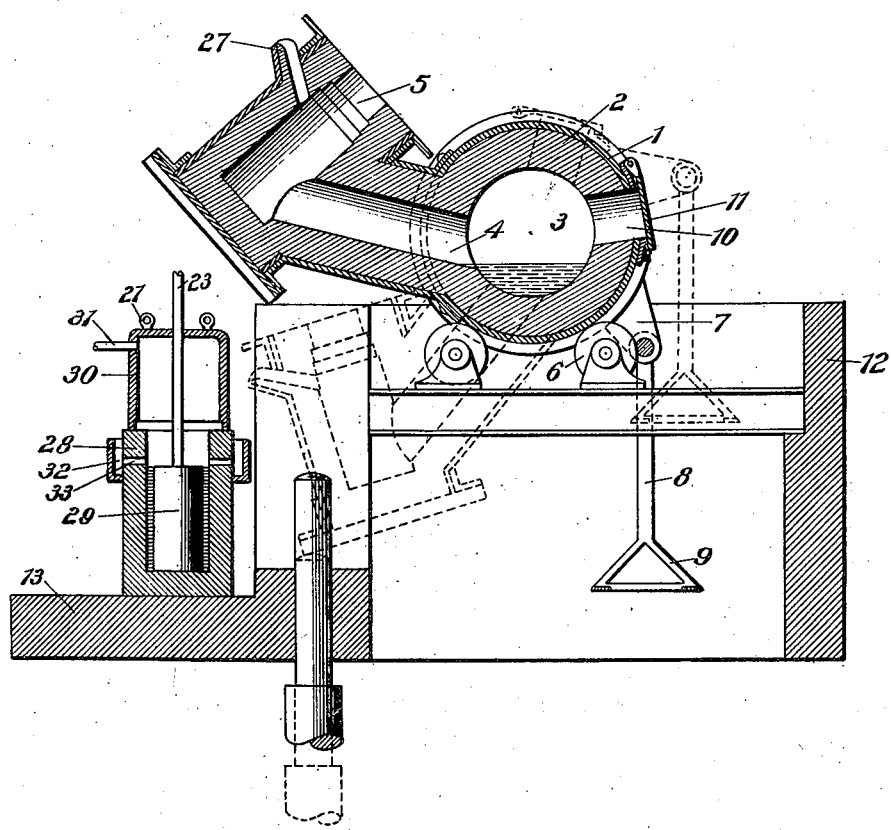
Figure 10:
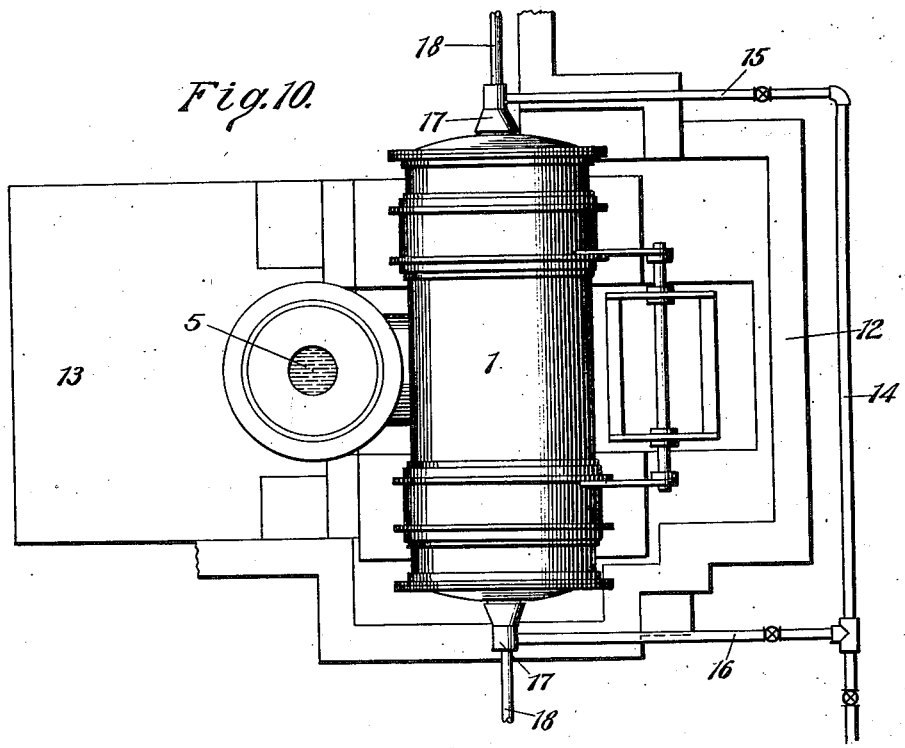
Figure 11:
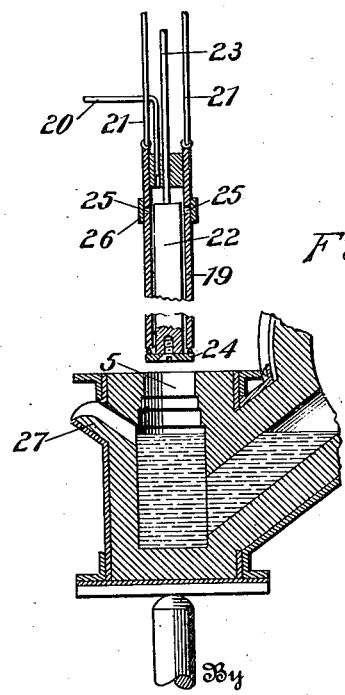

Figures 1 and 2 show views on an enlarged scale of polished and etched masses of ordinary copper of different brands; Fig. 3 is a similar section of an ordinary commercial wire bar; Figs. 4, 5 and 6 are representations on a similar scale of a microscopic appearance of the copper of the coating in a compound metal of the present invention; Fig. 7 is a view of the same copper after having undergone a reduction to ⅜ inch rod; Fig. 8 is a view taken across the line of union in clad metal under the present invention, showing the steel and copper and the intervening alloy film; Fig. 9 is a vertical, transverse section of a suitable tilting furnace in purifying position and also of a mold for direct casting; Fig. 10 is a plan view of the furnace; and Fig. 11 is a fragmental view of the same furnace with a dipping casing in position thereabove.

In the showing of the metal sections, the enlargement is the same in each view, such enlargement being 270 diameters. The views are, as nearly as possible, a reproduction of original photographs on file in our co-pending application Serial No. 558,093.

In the showing of Fig. 1, the metal is an excellent quality of commercial copper showing but little differentiation in texture. The showing of Fig. 2 is that of a lower grade of commercial copper. The white and the black areas are both copper, while the black spots are pittings and oxids. By careful examination of the view it will be noticed that there are lines of demarcation and separation between the crystals or areas of copper, and these lines contain more or less oxid of copper. Fig. 3 is a similar view of a sample of ordinary wire bar of fair quality.

Figs. 4, 5 and 6 show as nearly as possible within the limits of photography, the peculiar optical appearance under the microscope of a section of the new copper. After the new copper is well polished and is etched somewhat it displays to the eye a peculiar flashing appearance as if the surface were composed of flakes or plates without visible lines of demarcation between them. This optical appearance while very characteristic and very distinctive is hard to reproduce. On enlargement as in these views, this structure is less evident but the sets of parallel crystals together form the flake-like areas visible to the naked eye. In these views the flakes are resolved into a microstructure of parallel isometric crystals regularly arranged. Figs. 5 and 6 show this parallelism very clearly. Fig. 7 shows a microview of the same copper after the compound metal has been drawn out to ¾ inch rod. In drawing out and working down the copper, the peculiar structure which exists in the original billet of clad metal is, of course, changed considerably. Fig. 8 shows a view on the same scale of a clad metal billet, the view being taken across the line of joinder. The upper or homogeneous looking area is the copper and the lower is the steel. In polishing a sample such as this, it is difficult to adopt a method of polishing and etching which will show the peculiar microstructure of both metals. Between the upper copper area and the lower steel area is shown a band or layer of copper iron alloys. Upon examination this band will be seen to have an upper blackish area which is a high copper alloy. Below this are grayish areas of various copper iron alloys and below these again there is a layer of high iron alloy. That is, there is a layer of high copper alloy next the copper, and a layer of high iron alloy next the steel. The copper extends more or less into the edge of the iron area.

In the apparatus shown in Fig. 9, element 1 is a metallic casing of any suitable material lined with refractory material 2, and having a central flame and treatment chamber 3. Communicating with this chamber are ducts 4 set at an angle and communicating with chamber 5 for molten metal. This furnace chamber is arranged to be tilted on a horizontal axis and to facilitate tilting it is provided with bearings 6, and a shoulder 7 provided with lever arm 8 carrying a weight receiving device 9 to aid in counterbalancing. At one side opposite the metal duct the furnace chamber is shown provided with port 10 adapted to be closed by swinging door 11. 12 and 13 represent the framework carrying the furnace. Oil pipe 14 (see Fig. 10) provides for firing at either or both ends of the flame chamber by means of valved pipes 15 and 16 feeding burner 17 provided with air or steam injecting means 18.

The fragmentary showing in Fig. 11 is of the same furnace structure in dipping or purifying position, but above the pocket is shown mounted a segregating or dipping casing 19 provided with means 20 for introducing producer gas or other inert atmosphere and hoisting means 21 and 23 may be employed. This casing surrounds billet 22 which may have been sandblasted or otherwise treated and is provided with an end cap 24 adapted to make a tight joint with the bottom of the casing and an inlet 25 provided with sealing means 26. This sealing means may be a ring of asbestos or metal which is adapted to be pushed aside when the orifice is to be used for the introduction of metal. The billet may be coated either in the dipping casing just described or in a special mold, such as that shown in Fig. 9. For the use of this mold the dipping pocket of the furnace may be provided with a pouring lip 27. The mold indicated at 28 is shown as containing a filmed billet 29 and as surmounted by a protective casing 30, carrying gas feeding means 31 and used to shield the billet during the dipping operation. The mold is provided with a hopper, gutter or trough 32 communicating with its interior through restricted orifices 33. By pouring molten copper into this trough, the orifices may be kept covered with a layer of molten copper, preventing the access of air during the pouring operation. The mold may be provided with a molten flux, such as borax, cryolite, silicate of soda, slag, a halogen compound, such as salt, etc. Substances of this kind will be melted by the heat of molten copper and will act as a cleansing agent upon molten copper poured therethrough.

In the use of the structures shown in Figs. 9, 10, 11, copper may be melted in the chamber 3 by the oil flames from 18. The furnace may now be tilted and iron introduced in the copper in chamber 5, best by dipping a billet or rod therein. The copper for this operation is best at a temperature above the melting point of steel. The steel melting and dissolving in the copper frees it effectually of oxygens and oxids, while by dipping the relatively lighter steel in the relatively heavier copper the molten particles of steel upon rising flow through the copper and give a good distribution of iron therein. By carefully controlling the conditions of the operation merely enough steel may be brought into solution to remove oxygen and oxids, leaving the copper pure. Ordinarily an excess is introduced. Upon now tilting the furnace back into the purifying position and introducing a layer of floating carbon upon the surface of the copper, upon heating with the oil flame, this excess of iron burns out, leaving copper of the nature described. Upon again tilting the furnace the purified copper flows out into chamber 5 whence it may be cast through 27, into the ingot mold 28. Or instead of casting directly from the furnace, the purified copper may be run into ladles and cast from these around the filmed billet in mold 28.

Instead of forming the main body of the copper coating of the clad metal object by casting the purified copper around the filmed billet in a separate ingot mold as above described, the coating operation may also occur in chamber 5. Thus after having been filmed, the billet with the base plate 24 attached may be withdrawn from chamber 5 into casing 19, the joint between the plate and casing being sealed by asbestos packing or other suitable means. An inert or deoxidizing atmosphere is constantly maintained within the casing by introduction of a suitable gas in order to protect the newly formed copper film against oxidation. The body of copper in chamber 5 having been purified by treatment in 3, or a similar body of copper being already at hand in a second furnace, the filmed billet with its surrounding casing is plunged into chamber 5 so that the orifices 25 are below the surface of the molten copper. Closures 25 are removed so as to uncover the orifices in the casing, whereupon copper flows into the casing and fills the space between it and the filmed billet, after which the casing and billet are withdrawn from chamber 5 and allowed to cool, the copper thus trapped readily uniting with the film on the billet to form a substantial coating of copper weld united to the ferrous metal core. This method is very simple and is of special utility in making round copper clad billets. In applying this substantial coating, the temperature of the molten copper may be, and advantageously is, somewhat lower, than in forming the film coat. This is for the reason that the union of copper to the copper or the copper-iron alloy of the film on the billet readily occurs at temperatures below that necessary for the union of copper and iron or steel, while if excessively hot copper were employed in forming this substantial coating, the very hot copper might melt off the copper iron alloys on the surface of the billet and become contaminated. In ordinary working, the billets may be filmed in one apparatus and the pure copper applied in another, the pieces of apparatus being alternately used for dipping and for forming the substantial coat. Operating thus, the billets may be dipped into the copper until enough iron has dissolved therein to remove all impurities, the purified copper then freed of iron in the manner described, allowed to fall in temperature and then used for forming coatings.

By careful adjustment of working conditions, the billet to be filmed may be allowed to remain in the supermolten copper in the preliminary dipping just long enough to supply the amount of steel requisite to completely reduce all copper oxids in the bath, without any excess of iron being dissolved. The copper thus purified by the filming step may be allowed to cool somewhat and then cast against the filmed billet as described to form the substantial coating of pure copper weld united to the ferrous metal core. By still another modification of operating conditions, however, the desired reduction in temperature may also take place simultaneously with the filming and the purification of the copper. Where a small amount of very hot copper is contained in a comparatively small dipping vessel and the relatively cooler billet dipped therein, the first action is that of heating the surface of the billet to a very high temperature. At this temperature the solution of the iron, the reduction of the iron oxid, where such is present, and the purification of the copper all go on at once. As the heat penetrates inward in the billet, the temperature of the surrounding copper drops until it reaches the desired lower temperature, whereupon this copper may be directly applied to the filmed billet. For some purposes, a convenient method of operation is to run very hot copper into a relatively small hot dipping pocket or container, dip a billet thereinto until the copper is purified and the surface of the steel covered with welded-on copper, and then follow by dropping around the billet a mold casing adapted to inclose an annular layer of copper of the correct thickness about the billet, thereafter removing billet, casing and contained copper together. The apparatus shown in Fig. 11 is convenient to use in carrying out this modified process. Ordinarily it is better to perform the filming and coating operations in two separate steps rather than to combine them as just described, for the reason that it is difficult in the one step process to obtain the requisite purity of copper in the main body of the coating.

What we claim is:—

1. The process of preparing copper clad steel which comprises treating copper in a highly heated molten condition with iron in excess of the amount sufficient to react with oxygen and oxids present, removing such excess and then producing a solidified body of such copper united to a body of ferrous metal.

2. The process of producing copper clad steel which comprises treating copper in a highly heated molten condition with sufficient iron to remove oxygen and oxids present, removing any excess of iron which may be present, filming a steel object with a copper coating and producing a solidified body of the treated copper united to the filmed steel object.

3. The process of forming copper clad steel which comprises bringing a body of molten copper to a temperature in excess of that required to melt steel, dipping a body of steel into such copper until sufficient iron has dissolved to remove oxygen and oxids, burning out the excess of iron by preferential oxidation and forming a solidified body of the treated copper united to a body of ferrous metal.

4. The process of forming copper clad steel which comprises bringing a body of molten copper to a temperature in excess of that required to melt steel, dipping a body of steel into such copper until sufficient iron has dissolved to remove oxygen and oxids, burning out the excess of iron by preferential oxidation, producing a weld-film of copper on a steel object and forming a solidified body of the treated copper united to such steel object through such weld-film.

5. The process of forming copper clad steel which comprises producing a highly heated body of molten copper, dipping a billet into the same until dissolved iron removes oxygen and oxids and uniting the purified copper to a steel billet.

6. The process of forming copper clad steel which comprises removing oxygen and oxids from molten copper by dissolving iron therein and producing a solidified body of the purified copper united to a body of ferrous metal.

7. As a new article of manufacture, a clad metal article having a body of steel weld-united to a body of copper through an intervening layer of alloyed copper and iron, such body of copper upon polishing and etching exhibiting a relatively coarse platy or flaky macrostructure and microscopically examined displaying a crystal structure of regularly arranged isometric crystals having the same orientation within any one flake or plate, the lines of orientation within adjacent flakes or plates not being the same, but displaying no apparent line of cleavage or demarcation between such adjacent flakes or plates.

8. As a new article of manufacture, a clad metal article having a body of steel weld united to a body of copper through an intervening layer of alloyed copper and iron, such intervening layer comprising a stratum of a high copper alloy next the said body of copper, and a stratum of a high iron alloy next the said body of steel.

9. The process of producing copper clad steel which comprises contacting a body of steel with a body of molten copper to film coat said billet with copper-iron alloy and introduce dissolved iron in said body of molten copper, oxidizing out the iron so dissolved in order to produce pure copper and then uniting a coating of the so-purified copper to such a film coated billet.

In testimony whereof, we affix our signatures in the presence of two witnesses.

WILLIAM MARSHALL PAGE.
WIRT TASSIN.

Witnesses:
P. M. WEIS,
J. BRUNDAGE.